United States Patent
Kinney, Jr. et al.

(10) Patent No.: US 6,779,784 B2
(45) Date of Patent: Aug. 24, 2004

(54) COOLING TOWER METHOD AND APPARATUS

(75) Inventors: Ohler L. Kinney, Jr., Overland Park, KS (US); Robert S. Glauz, Lee's Summit, MO (US); Brian F. Wright, Merriam, KS (US); Kathryn L. Pullen, Lenexa, KS (US); Eldon F. Mockry, Lenexa, KS (US)

(73) Assignee: Marley Cooling Technologies, Inc., Overland Park, KS (US)

( * ) Notice: Subject to any disclaimer, the term of this patent is extended or adjusted under 35 U.S.C. 154(b) by 145 days.

(21) Appl. No.: 10/020,957

(22) Filed: Dec. 19, 2001

(65) Prior Publication Data

US 2003/0085476 A1 May 8, 2003

Related U.S. Application Data

(60) Provisional application No. 60/330,896, filed on Nov. 2, 2001.

(51) Int. Cl.$^7$ .................................................. B01F 3/04

(52) U.S. Cl. ................... 261/28; 261/109; 261/DIG. 11

(58) Field of Search ............................ 261/28, 29, 108, 261/109, 110, 111, 112.1, 112.2, DIG. 11

(56) References Cited

U.S. PATENT DOCUMENTS

| | | | |
|---|---|---|---|
| 3,875,269 A | 4/1975 | Forchini et al. | 261/111 |
| 4,416,836 A | 11/1983 | Sinek | 261/112 |
| 4,422,983 A | 12/1983 | Bardo et al. | 261/24 |
| 4,514,202 A | 4/1985 | Kinney, Jr. et al. | 55/440 |
| 5,227,095 A | * 7/1993 | Curtis | 261/30 |
| 5,487,849 A | 1/1996 | Curtis | 261/30 |
| 5,501,269 A | * 3/1996 | Jenkins | 165/110 |
| 5,569,415 A | 10/1996 | Phelps | 261/23.1 |
| 6,250,610 B1 | 6/2001 | Flaherty et al. | 261/109 |
| 2002/0024156 A1 | * 2/2002 | Flaherty | 261/109 |

OTHER PUBLICATIONS

International Search Report dated Jan. 14, 2003.

* cited by examiner

*Primary Examiner*—Scott Bushey
(74) *Attorney, Agent, or Firm*—Baker & Hostetler LLP

(57) ABSTRACT

A cross-flow cooling tower having a frame assembly that is unitarily molded from a plastic material. The frame assembly has opposing top and bottom walls along with opposing side walls and opposing ends. The side walls extend parallel to one another between the top and bottom walls. In addition, the opposing ends extend parallel to one another between the top and bottom walls. The frame assembly additionally has a vertical stack extending vertically from the top wall. The top covers of the tower extend outwardly and downwardly from the vertical stack.

28 Claims, 9 Drawing Sheets

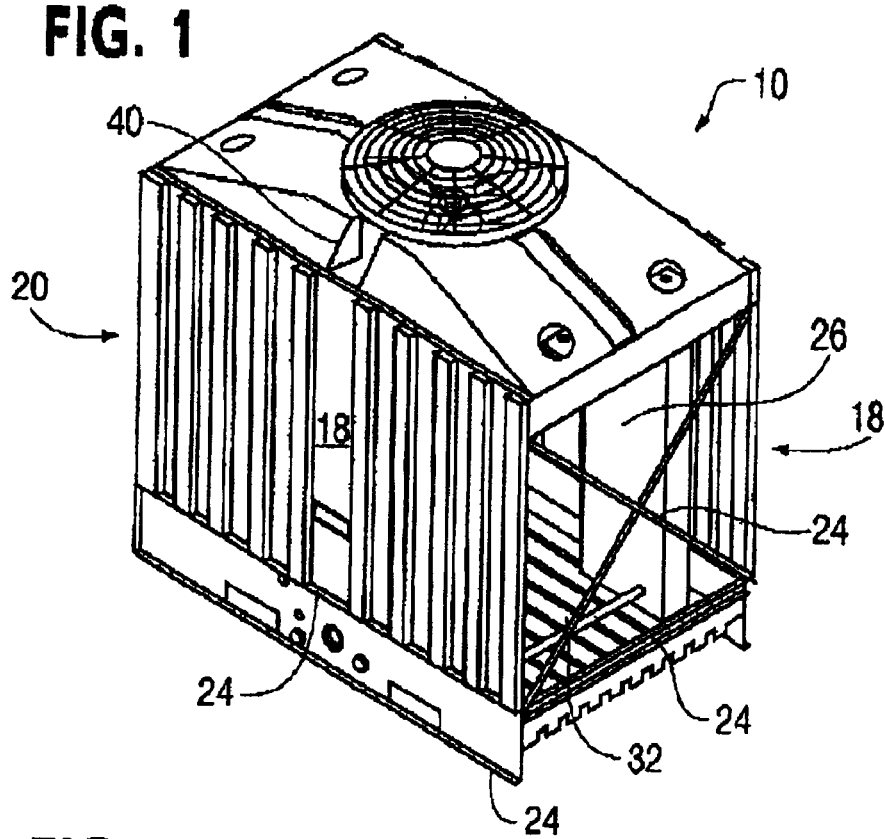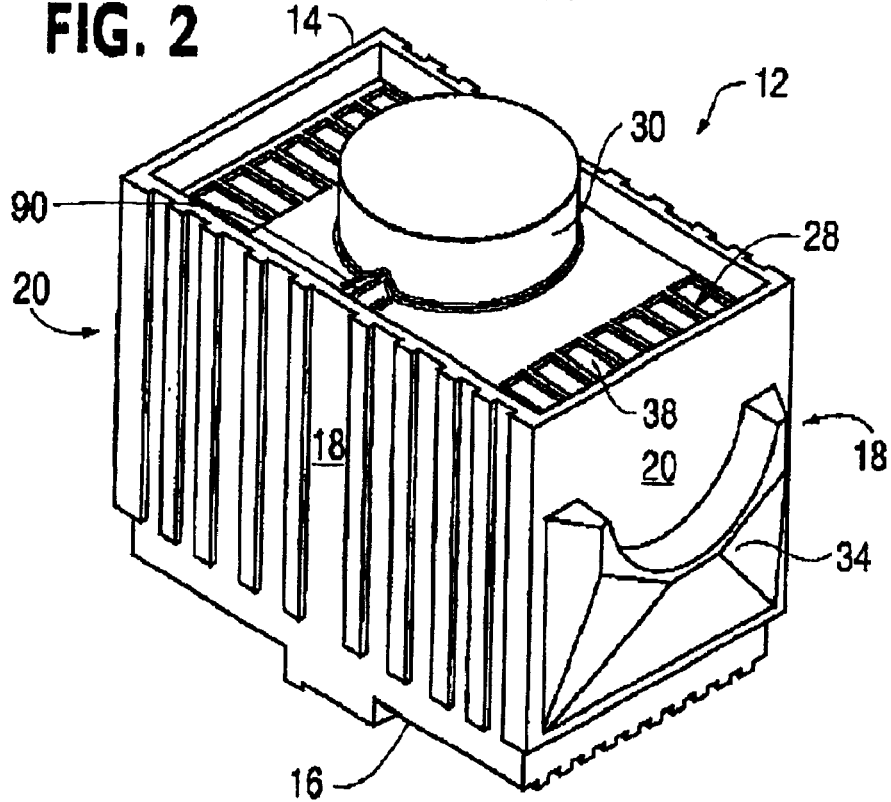

COOLING TOWER METHOD AND APPARATUS

PRIORITY

This application claims priority to the provisional U.S. patent application entitled, COOLING TOWER METHOD AND APPARATUS, filed Nov. 2, 2001, having a Ser. No. 60/330,896, the disclosure of which is hereby incorporated by reference.

FIELD OF THE INVENTION

The present invention relates generally to a method and apparatus for the disposal of heat utilizing a heat exchange liquid. More particularly, the present invention relates to a method and apparatus for a cross-flow water cooling tower wherein the water cooling tower is employed, for example, to dispose of large quantities of heat generated by various industrial processes.

BACKGROUND OF THE INVENTION

Cooling towers are used in many applications. For example, air conditioning systems for large buildings employ cooling towers for carrying out a portion of the heat exchange that is essential to the cooling process. Industrial processes, such as chemical production, metals production, plastics production, food processing, etc., generate heat that must be disposed of, often by the use of cooling towers. The cooling tower is a housing that channelizes air in proximity to a heat exchange liquid, for example, water. A heat exchange fluid may be circulated through the cooling tower and at least one fan may be mounted on the cooling tower to produce a flow of cooling air in proximity to the heat exchange liquid. Heat is transferred from the heat exchange fluid to the air, largely through the evaporation of a small percentage of fluid which substantially lowers the temperature of the primary heat exchange fluid. The cooled heat exchange fluid can then return to the industrial process to perform a heat exchange function for either industrial processes or commercial air conditioning systems Conventional cross-flow cooling towers are presently in widespread use in such areas as factory complexes, chemical processing plants, hospitals, apartment and/or condominium complexes, warehouses and electric generating stations. Conventional cross-flow cooling towers are constructed with upright unitary or sectionalized fill structures surmounted by hot water distribution basins and cold water collection basins. Th hot water basins are usually equipped with target nozzles or other hot water distributors which distribute the incoming water over the fill. The interior space bounded by the fill structures and the cold water basins define the plenum for the tower. A fan assembly made up of an apertured horizontal deck, which supports an upright, venturi-shaped stack, is positioned at the upper opening of the water cooling tower. This configuration provides a plenum large enough to enable a smooth transition of the flow gas from the generally horizontal direction, through the fill assembly, to the generally vertical direction, and out the exhaust port of the tower assembly. In the operation of the cross-flow cooling towers, hot water is introduced at the top of the fill while the air is introduced along the upright sides of the tower. As the water descends in an even distribution along the fill section, the cooling cross-flow air currents intersect the descending water in a heat exchanging relation. Subsequently, the cooled water is collected in a water basin below while the hot, moist air is discharged into the atmosphere.

In a cross-flow cooling tower, there is no necessity for the air to make radical changes of direction into the fill and the air inlet is spaced along the entire height of the fill. Therefore, the overall air pressure losses in the fill are usually less than those of a conventional counter-flow tower resulting in the passing of air through the tower more easily.

Conventional cross-flow cooling towers generally employ various varieties of splash-type fill sections consisting of elongated bars of a specific configuration for dispersing the descending released water. More recently, film type fill sections have been developed which have proven substantially more efficient than splash fill sections. These typically corrugated film fills generally consist of a series of thin, opposed sheets formed of synthetic resin materials in which water passes along the sheets of "film".

The highest potential for cooling exists at the top of the air inlet sides where the hottest water comes into contact with the coldest air. Once such air has been heated such that the wet bulb temperature of the air is near the water temperature, the air has no more capacity to cool the water, and such heat saturated air prevents the introduction of cooler ambient air into the fill. Air near the top of the tower typically experiences this condition because it initially contacts the hottest water, and all other water along its path of travel is about the same temperature, Air entering near the bottom of the tower initially is exposed to water that has been significantly cooled. As it traverses through the fill, the temperature of the water encountered by the bottom air currents rises, which allows the air to take on more heat.

The hot water basins in a cross-flow tower are normally constructed to serve as an air seal to prevent air entering the tower through the top of the fill. Additionally, air seals along the length of the tower are provided along the inboard and outboard edges of the basins to seal from the bottom of the basins to the top of the fill. These seals prevent air from entering the spray chamber and bypassing the fill structure. Sealing of the distribution basins also minimizes the contact between incoming air currents and relatively large water particles adjacent the spray nozzles or water distributors.

Presently, a majority of unitary cooling towers are assembled from a plurality of pieces of sheet metal that are mounted to a metallic support frame. Unitary cooling towers typically are manufactured at a location remote from the installation site. The towers are then shipped to the installation site in a substantially assembled form. Due to the metallic materials with which the cooling towers are assembled, the towers are fairly heavy and therefore require extensive structural support. In addition, the cost of present cooling towers are also adversely affected by the labor intensive processes for manufacturing and assembling the various metallic components of the cooling towers.

Metallic cooling towers are also subject to corrosion and/or rust. Thus, the metallic towers have a relatively short operational life. Corrosion and/or rust problems can be deterred by employing corrosion and/or rust resistant alloys. However, these metallic materials significantly increase the manufacturing cost of the water cooling tower. Alternatively, plastics such as polyethylene are well known for being moldable into prescribed form and function and are utilized in the art. However, polyethylene material properties are relatively weak and flexible. To compensate for these properties in monolithic parts, designers must use large quantities of polyethylene to create bigger, thicker and deeper sections to minimize stresses and deflections.

Accordingly, it is desirable to provide a cooling tower design that offers a substantial reduction in parts, avoiding complex and costly assembly of components. It is also desirable to manufacture a water cooling tower that is light in weight, durable and resists corrosion.

SUMMARY OF THE INVENTION

The foregoing needs are met, to a great extent, by the present invention where, in one aspect, a cross-flow cooling tower is provided having a frame assembly that is unitarily molded from a plastic material. The frame assembly has opposed top and bottom walls that are parallel to one another along with opposed, parallel side walls that extend between the top and bottom walls. The frame assembly also has opposed, parallel ends that similarly extend between the top and bottom walls. The cross-flow cooling tower additionally has a vertical stack that extends vertically from the top wall. The top covers of the cross-flow cooling tower project outwardly and downwardly from the vertical stack, contacting the side walls and the opposing ends of the water cooling tower.

In accordance with another aspect of the present invention, a frame assembly is provided having a shell unitarily molded from plastic material. The unitary shell includes opposed parallel top and bottom walls along with opposed parallel end walls. The aforementioned side walls and ends both extend between the top and bottom walls.

In accordance with yet another aspect of the present invention, a top for a cooling tower is provided having a hot liquid inlet and a generally planar bottom with at least one opening therein for accommodating an air current generator. In addition, the planar bottom has a plurality of hot liquid distributors oriented to distribute hot liquid. The cooling tower top additionally has opposed parallel side walls unitarily connected to the bottom wall. In addition, the cooling tower top has opposed, parallel end walls connected to the bottom wall. The aforementioned side and end walls are unitarily connected to a top wall wherein the top wall has at least one opening formed therein for accommodating an air current generator. The top wall projects outwardly and downwardly from the opening.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a perspective view of a cross-flow cooling tower in accordance with a first embodiment of the present invention.

FIG. 2 is a perspective view of a rotationally molded unitary frame assembly of the first embodiment of the present invention with tower covers unitarily attached to the opposing frame ends.

DETAILED DESCRIPTION OF PREFERRED EMBODIMENTS OF THE INVENTION

Figure 3:
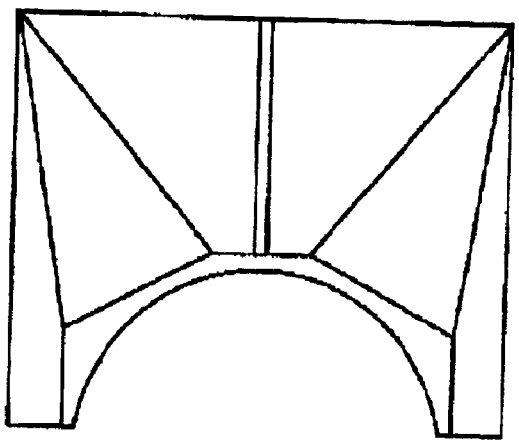
FIG. 3 is a top view of a top tower cover in accordance with the first embodiment of the present invention after the cover has been detached from an opposing end of the unitary frame assembly illustrated in FIG. 2.

Referring now to the figures wherein like reference numerals indicate like elements, FIGS. 1–15 illustrate the presently preferred embodiments of a cross-flow cooling tower. While in the embodiment depicted the tower is a water cooling tower, it should be understood that the present invention is not limited in its application to water cooling towers, and can be used for other types of cooling towers.

Figure 4:
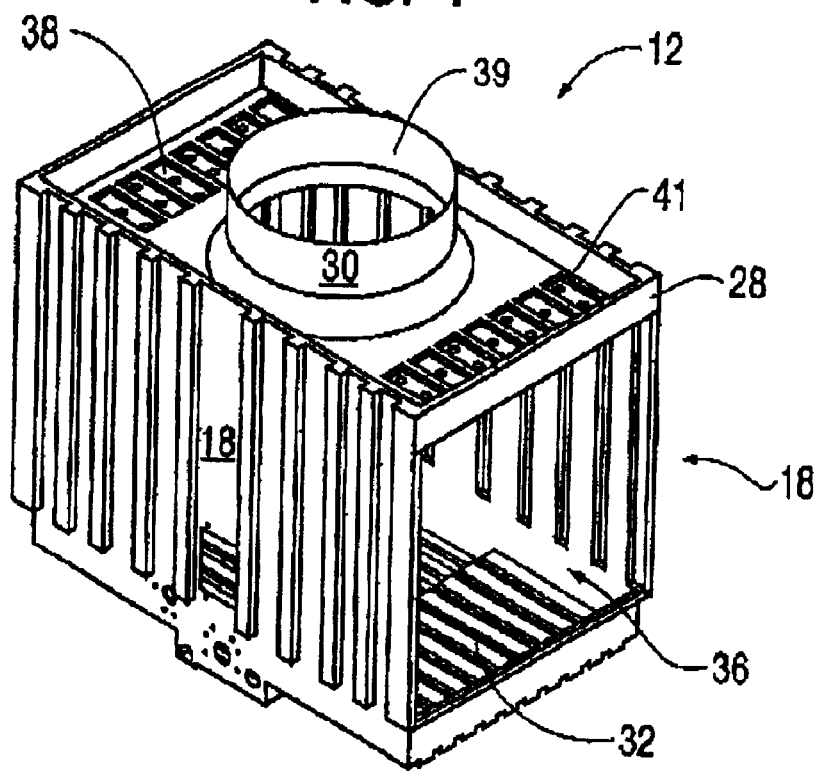
FIG. 4 is a perspective view of the rotationally molded unitary frame assembly of the first embodiment of the present invention with the tower covers removed from the frame ends revealing the air intake ports of the frame assembly.

Referring now to the first embodiment illustrated in FIGS. 1–6, a cross-flow cooling tower, generally designated 10, is illustrated for contacting generally horizontally flowing gas in a cooling relationship with generally vertically descending r liquid. As seen in FIG. 4, the cooling tower includes a frame assembly 12 that is unitarily molded from polyethylene in a rotational mold, illustrated in FIG. 2, having a top 14, a bottom 16, two opposed side walls 18 and two opposed ends 20. More particularly, as seen in FIGS. 1–6, the tower is made up of a unitarily molded polyethylene frame assembly 12 reinforced by a mill galvanized steel skeleton 24, two upright fill assemblies 26, a hot water distributor 28 located above the fill assemblies 26, a vertical stack 30 extending upwardly from the hot water distributor 28, a cold water collection basin 32 below the fill assemblies 26, air intake ports 36, an exhaust port 39 and a cooling air current generator employing a fan unit 37. Skeleton 24 may be composed of other suitable materials such as stainless steel, hot dipped galvanized steel, epoxy coated steel, FRP (fiber reinforced plastic), etc. Fill assemblies 26 extend across the entire faces of air intake ports 36. Only a few fill sheets are shown in assemblies 26 to add clarity to the structural features of tower 10.

After removal of the covers 34, the unitary frame assembly 12 includes two opposed side walls 18 that extend parallel to one another and are unitarily connected to a bottom generally planar wall and a top planar wall. The side walls 18 intersect the top generally planar wall to form the sides of the hot water distributor 28 above the fill assemblies 26 and intersect the bottom generally planar wall to form the side walls of the cold water collection basin 32 below the fill assemblies 26. As can be observed in FIG. 2, the opposed ends 20 of the frame assembly 12 intersect both the top and bottom generally planar walls of the cooling tower, forming the end barriers to the hot water distributor 28 and the cold water collection basin 32 respectively.

As illustrated in FIG. 2, initially, the unitarily polyethylene frame 12 is rotationally molded having solid opposing ends 20 wherein the cooling tower covers 34 are molded to be included within the opposing ends 20. Upon completion of the molding process, the solid opposing ends 20 and the tower covers 34 connected therein, are removed from the unitary frame 12 by a cutting means. The tower covers 34 are then prepared for installation and assembly above the hot water distributor 28. As a result of the removal of the tower covers 34, the opposing ends 20 of the cooling tower are designated air intake ports 36 when the tower is in operation. The aforementioned rotational molding of the unitary frame body 12 and following removal of the tower covers 34 offers a cost effective way for manufacturing and assembling a cross-flow water cooling tower by limiting the waste of manufacturing materials and by substantially reducing the amount of parts and assembly required.

In lieu of molding the tower covers 34 in opposed ends 20, louvers to prevent splash out of water may be molded into this face. Air inlet openings may be fabricated by removing the material around the intended louver structure. Molding the louvers in this face negates the requirement for attaching separate louvers or providing fill with integral louvers.

As illustrated in FIG. 4, the unitarily molded frame assembly 12 includes a hot water distributor 28 with a vertical stack 30 extending vertically therefrom and a cold water collection basin 32 disposed below the distributor. The frame 12 additionally includes two opposing side walls 18 that extend parallel to one another between the collection basin 32 and hot water distributor 28. The assembly also has two opposing intake ports 36.

Figure 13:
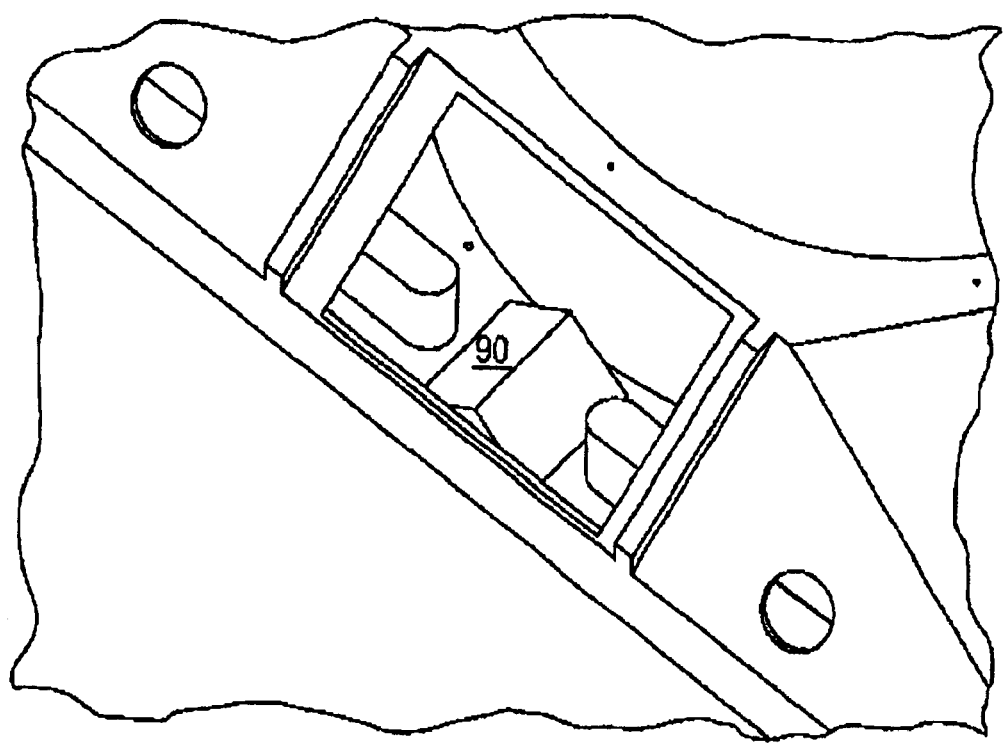
FIG. 13 is a perspective view a flow splitter employed in a preferred embodiment of the present invention.
Figure 14:
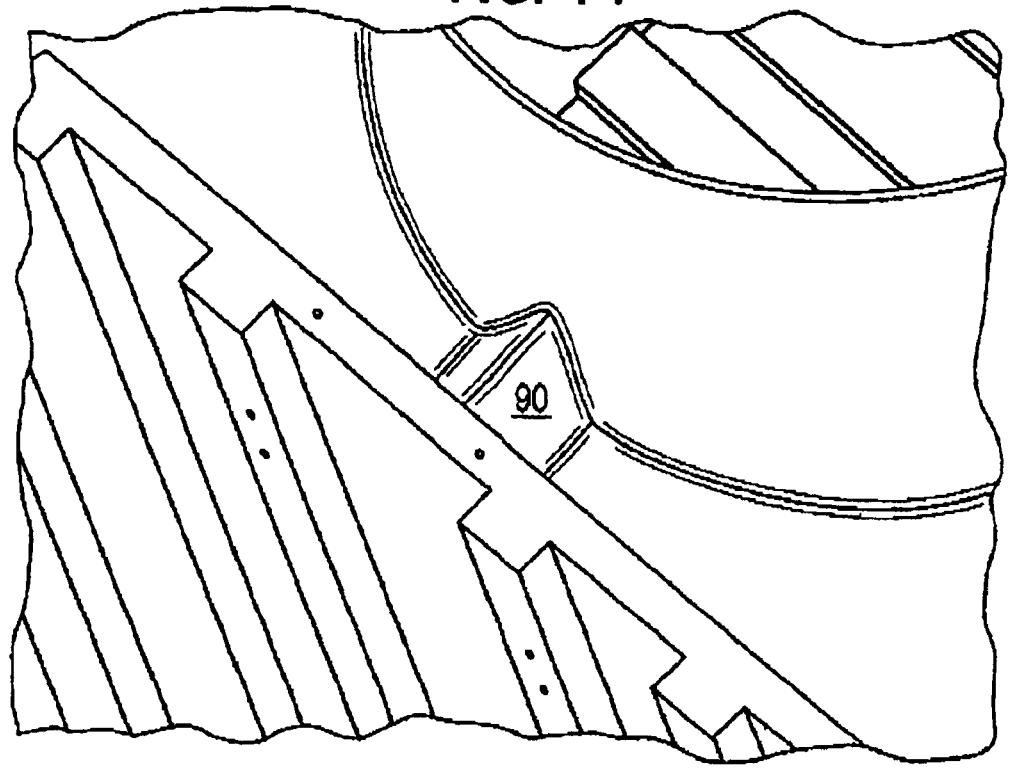
FIG. 14 is a perspective view of a flow splitter employed in a preferred embodiment of the present invention.

The hot water distributor 28 contains a distribution pan or tray 38 positioned directly above the fill assemblies that permits water to gravitate through a plurality of apertures, perforations and/or nozzles 41 onto the top surfaces of the upper film sections of the fill assemblies 26. The water is supplied to the distribution pan or tray by way of supply pipe (not shown) and enters the assembly via the water inlet 40 shown in FIG. 1. Water is delivered to hot water distributor 28 and is distributed evenly to both sides with the aid of a generally inverted "V" shaped flow splitter 90 as illustrated in FIGS. 13 and 14. Flow control devices or valves are not required to balance the flow. Flow splitter 90 divides the flow and provides a barrier to prevent transitory or oscillatory flow variation from side to side.

The cold water collection basin 32 is disposed below the fill assemblies 26 in a position to receive liquid gravitating therefrom. The basin extends across the entire width of the cooling tower 10 and may be coupled to a pumping structure (not shown) suitable for removing deposited liquid therein and for delivering the water to equipment requiring the same for cooling and/or returning the water to the supply source.

Figure 5:
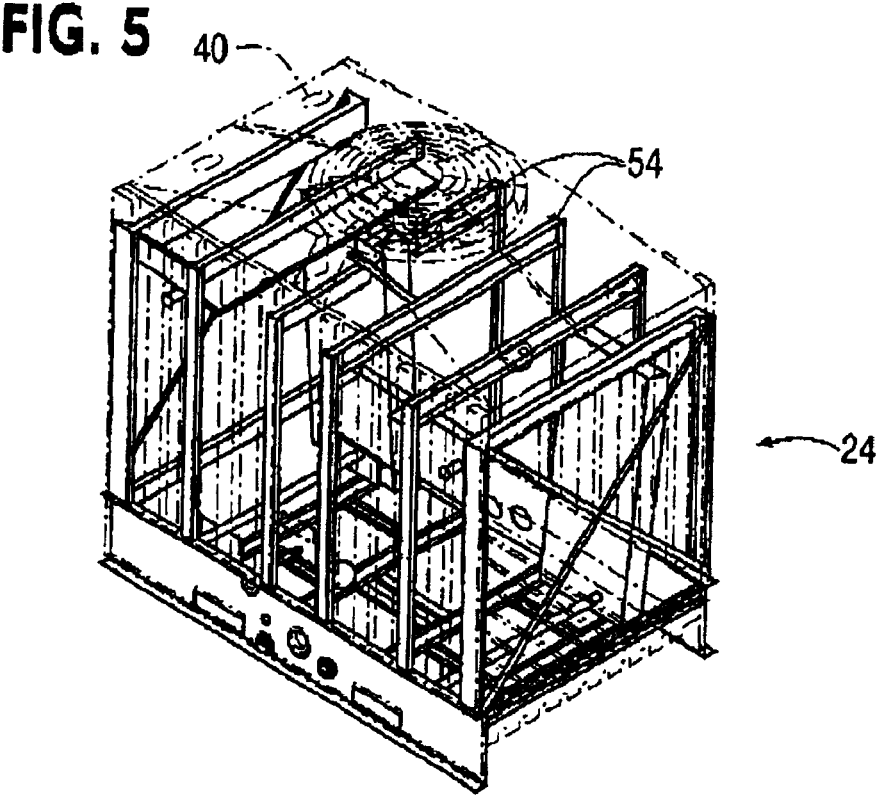
FIG. 5 is a perspective view of a cross-flow cooling tower in accordance with the first embodiment of the present invention with the rotationally molded unitary frame assembly shown in phantom.

Referring now to FIG. 5, the polyethylene frame of the cooling tower 10 and components contained therein, a supported by conventional mill galvanized steel framework 24 as shown. The framework 24 offers support and strength to the tower frame while making the tower more durable, extending the cooling tower's operational life.

Polyethylene is a well-known plastic material used substantially for liquid containers such as milk jugs, and gallon gasoline containers. Polyethylene is a relatively inexpensive plastic and is dependable for containing liquids at low-pressure. However, polyethylene has relatively low material mechanical properties. The modulus of elasticity is only about 80,000 psi to 100,000 psi. By contrast the modulus of elasticity of steel is 29,000,000 psi which is about 300 times that of polyethylene. The implications for deflections are huge. For simple beams of the same geometry and loading, the one made of polyethylene will deflect 300 times the deflection of the steel beam. Therefore, to limit the deflections of polyethylene structures, the unsupported spans must be reduced very substantially and/or the cross-section increased very substantially compared to steel structures.

For example a simply supported beam subjected to a uniform load experiences a maximum deflection, $\Delta$, according to following equation:

$$\Delta = 5wL^4/(384EI) \tag{1}$$

in which
- w=uniform load per unit length
- L=length of simple span
- E=modulus of elasticity
- I=moment of inertia of the beam cross-section To maintain the same deflection for a given span, L, and given uniform load, w, the product of EI for each beam must be constant:

$$E_p I_p = E_s I_s \tag{2}$$

in which subscripts p and s are polyethylene and steel respectively.

Solving for the required polyethylene moment of inertia gives the following equation:

$$I_p = I_s E_s / E_p \tag{3}$$

Taking the modulus of elasticity as 29,000,000 psi for steel and 100,000 psi for polyethylene, the required polyethylene beam moment of inertia is $$I_p = I_s (29,000,000 / 100,000) \quad (4)$$
$$= 290 \, I_s$$

For a simple rectangular beam cross-section the moment of inertia is computed as follows:

$$I = bh^3/12 \quad (5)$$

in which
b=beam width
h=beam height

Assuming a constant proportion of the width, b, to the height, h, the moment of inertia can be rewritten as:

$$I = \alpha h^4/12 \quad (6)$$

in which
$\alpha = b/h$ or $b = \alpha h$

Substituting equation 6 with respective subscripts for steel and polyethylene in equation 4 and solving for the height of the polyethylene beam cross-section gives the following equation:

$$h_p = (290 \, h_s^4)^{0.25} \quad (7)$$
$$= 4.13 \, h_s$$

Therefore, the cross-section of the polyethylene beam must be over 4 times wider and over 4 times higher to carry the same load and maintain the same deflection for a given span. The cross-sectional area, A, for the rectangular cross-section is $$A = bh \quad (8)$$

Substituting the proportionality constant expression, $b = \alpha h$, from equation 6 gives the equation $$A = \alpha h^2 \quad (9)$$

The cross-sectional area of the polyethylene beam, $A_p$, is $$A_p = \alpha \, h_p^2 \quad (10)$$
$$= \alpha \, (4.13 \, h_s)^2$$
$$= 17.1 \, \alpha \, h_s^2$$
$$= 17.1 \, A_s$$

Therefore, the cross-sectional area of the polyethylene beam is over 17 times that of the steel beam. The specific gravity of steel and polyethylene relative to water are about 7.85 and 0.94 respectively. Steel weighs about 7.85/0.94=8.4 times as much as polyethylene for the same volume of material. The volume of the beam, V, is $$V = AL \quad (11)$$

The volume of the polyethylene beam may be expressed in terms of the volume of the steel beam as follows:

$$V_p = A_p L \quad (12)$$
$$= 17.1 \, A_s \, L$$
$$= 17.1 \, V_s$$

The weight of the beam is determined by multiplying the specific weight, $\gamma$, times the volume.

$$W_s = \gamma_s \, V_s \quad (13)$$
$$W_p = \gamma_p \, V_p \quad (14)$$
$$W_p = (\gamma_p/\gamma_s) \, \gamma_s \, (17.1 \, V_s) \quad (15)$$
$$= 17.1 \, (\gamma_p/\gamma_s) \, W_s$$

The specific weight of steel, $\gamma_s$, is 490 lb/cf, and the specific weight of polyethylene is about 59 lb/cf. Therefore, the weight of the polyethylene beam compared to the weight of the steel beam may be expressed as follows:

$$W_p = 17.1 \, (59/490) \, W_s \quad (16)$$
$$= 2.06 \, W_s$$

Therefore, the polyethylene beam is actually more than twice the weight of the steel beam. Furthermore, rotationally molded polyethylene costs more per unit weight than does fabricated heavy mill galvanized (HMG) steel per unit weight. Thus, it is not economical to directly replace an HMG steel beam with a polyethylene beam as it would cost more than twice as much.

The yield strength of polyethylene ranges from about 1300 psi to 2800 psi. The yield strength of steel is about 36,000 psi, which is about 28 to 13 times the strength of polyethylene. However, polyethylene is a viscoelastic material which creeps (or moves) under sustained load. Long term sustained stress levels must be kept low to prevent this viscoelastic behavior from causing unacceptable deflections over time. Steel does not creep and is not subject to this limitation.

Taking the beam example above for constant deflections, the maximum bending stress, $f_b$, may be computed from the following equation:

$$f_b = MS \quad (17)$$

in which $$M = \text{bending moment} = wL^2/8 \quad (18)$$
$$S = \text{section modulus} = bh^2/6 = \alpha h^3/6 \quad (19)$$

The section modulus of the polyethylene beam may be expressed in terms of the section modulus of the steel beam as follows:

$$S_p = \alpha \, h_p^3/6$$
$$= \alpha \, (4.13 \, h_6)^3/6$$
$$= 70.4 \, (\alpha \, h_6^3/6)$$
$$= 70.4 \, S_s$$

Therefore, since the bending moment is assumed constant for the example, the maximum bending stress in the polyethylene beam may be expressed in terms of the maximum bending stress of the steel beam as follows:

$$f_{bp} = M/S_p$$
$$= M/(70.4\ S_s)$$
$$= f_s/70.4$$

Steel members are often sized for a maximum stress of about 0.6 of the yield strength which is 0.6 (36,000 psi)=21,600 psi. The polyethylene maximum bending stress would be 21,600 psi/70.4=307 psi. This is about 0.1 to 0.2 times the yield strength of the polyethylene, which normally is sufficient to control creep.

The structural comparisons above show that polyethylene is not economical for structural applications. On the other hand steel is very well suited for structural applications and has been used in a wide variety of applications including unitary cooling towers. Polyethylene is corrosion resistant and formable by rotational molding into multiple functional shapes. The two materials compliment one another in a structural hybrid cooling tower design to produce a cost effective, durable product. A steel skeleton provides load paths to support the polyethylene components.

Figure 6:
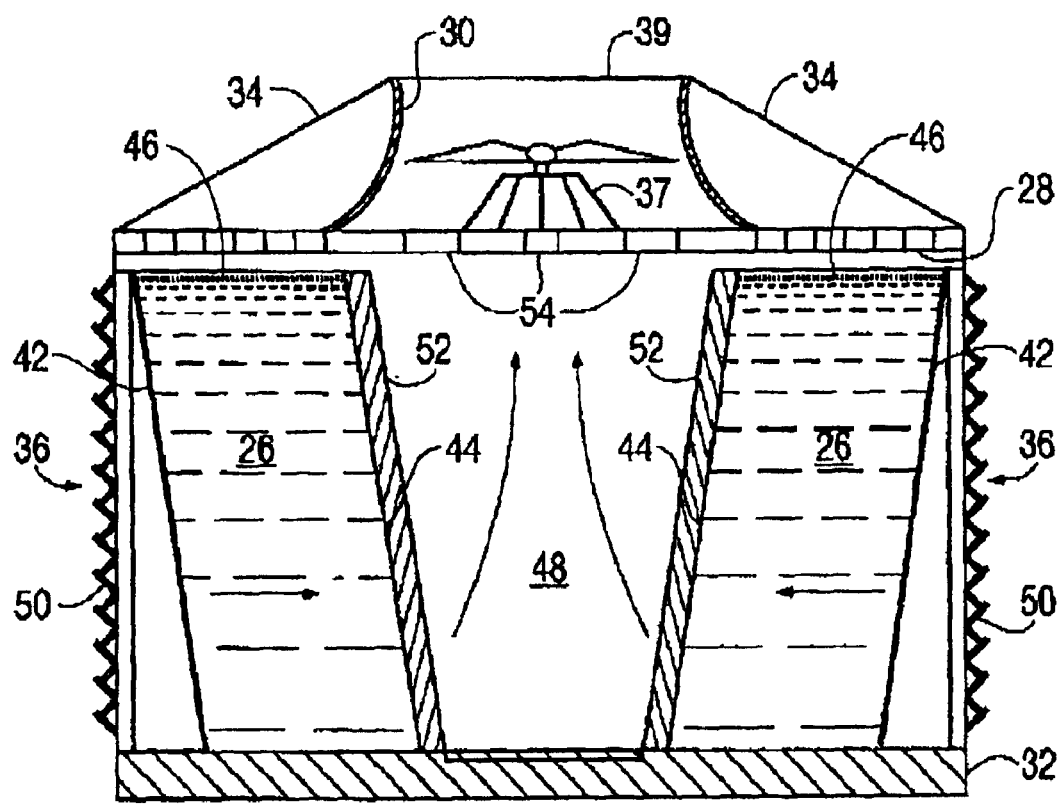
FIG. 6 is a side cross-sectional view of a cross-flow cooling tower according to the first embodiment employing a rotationally molded, unitary frame assembly with top covers.
Figure 8:
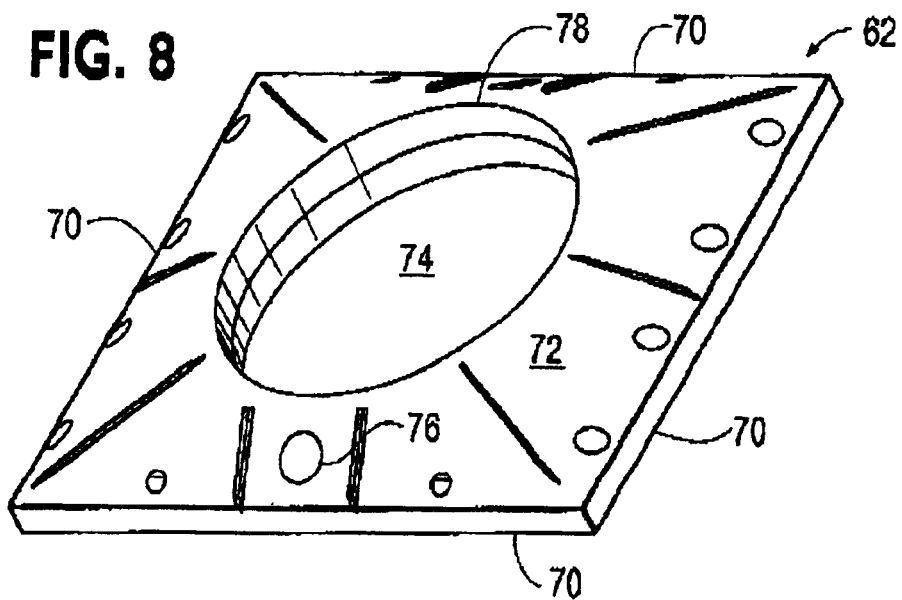
FIG. 8 is a perspective view of a hot water distribution unit in accordance with the second embodiment of present invention.
Figure 9:
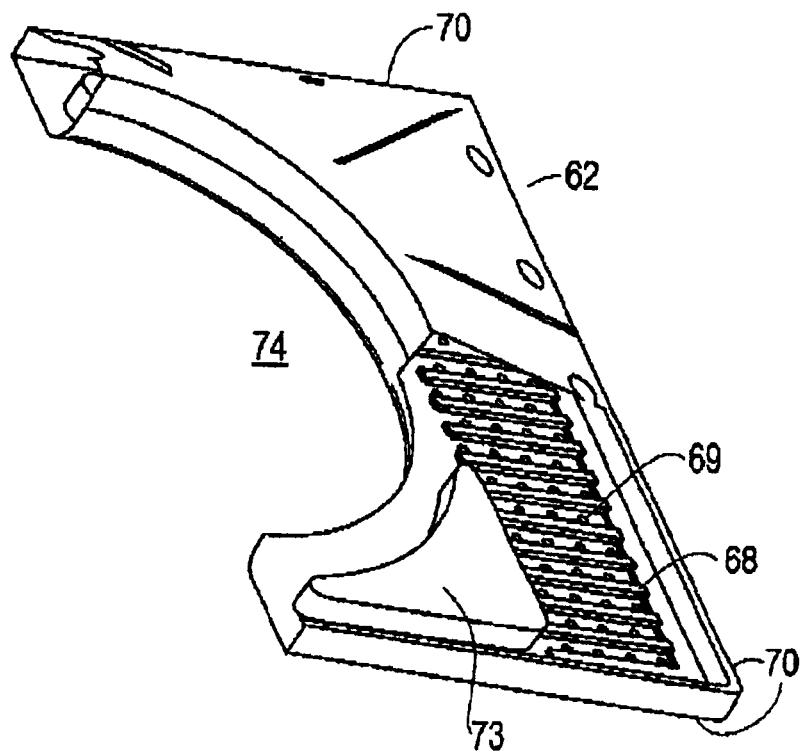
FIG. 9 is a partial, cutaway view of the hot water distribution unit in accordance with the second embodiment of the present invention and showing a distribution pan or tray contained therein.
Figure 10:
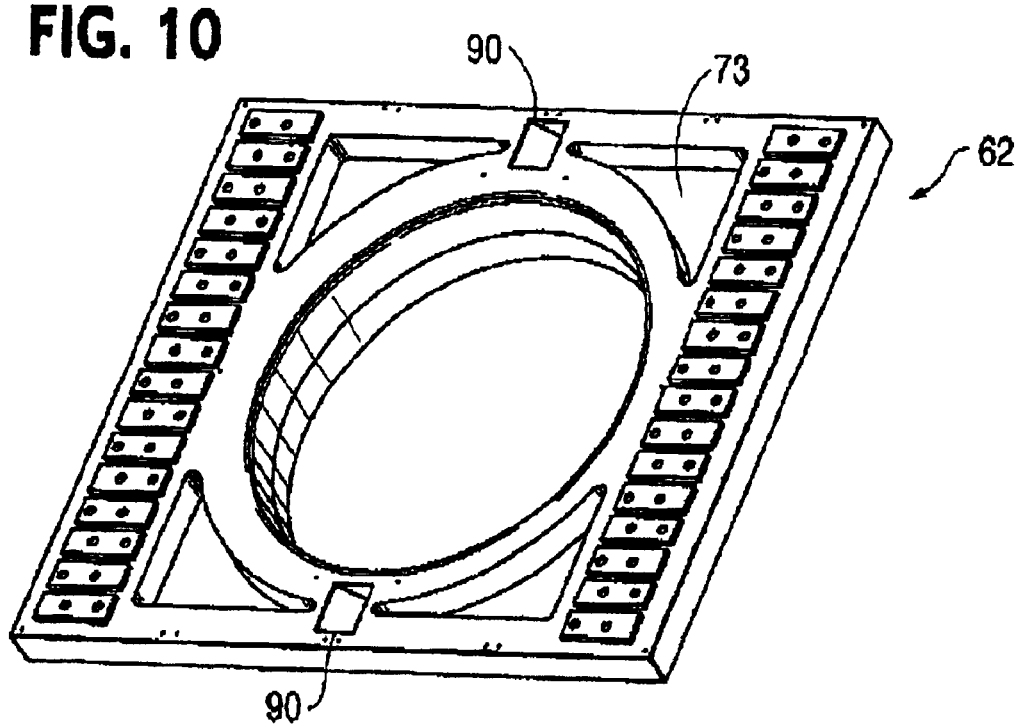
FIG. 10 is a perspective view of the underside of the hot water distribution unit of FIG. 9 in accordance with the second embodiment of the present invention.

As illustrated in FIG. 6, the fill assemblies 26 of the tower employ up to a total of two film type fill packs or units which are aligned in a duplicate fashion in two opposed units so as to present a double-flow tower. Each of the units is made up of a plurality of upright, spaced apart film fill sheets of chevron or herringbone design. The film fill sheets are integrally constructed to include both louvers and eliminators, which for example, may be the type illustrated in U.S. Pat. No. 4,548,766. Each of the units and thus the overall fill assemblies 26, present upright air inlet faces 42, opposed, upright air outlet faces 44, and a generally horizontal upper face 46 extending between the inlet face 42 and the outlet face 44. Therefore as a result of the individual fill assembly orientation, the gas inlet 42 and outlet 44 openings enable the flow of gas over substantially the entire vertical height of the fill assembly into the central plenum chamber 48 of the water cooling tower 10.

Alternatively, the air inlet 42 faces may be provided with stationary louvers 50 utilized to prevent water from splashing out of the tower. Again, these louvers may be rotationally molded in opposed ends 20 in lieu of basin covers 34. A drift eliminator wall 52 can be disposed across the air outlet faces 44 and in generally an upright position to prevent entrained droplets of water from entering the plenum chamber 48 as spray. The wall may be of any type for example, a honeycomb type eliminator or a series of spaced inclined baffles that permit the free flow of air there through but prevent significant quantities of liquid droplets from escaping the fill assemblies 26. An exemplary eliminator is disclosed in U.S. Pat. No. 4,514,202. The fill assemblies 26, in conjunction with their respective eliminator walls, combine to form the tower's central plenum 48.

FIG. 6 illustrates that a vertical stack 30 is disposed above the hot water basin 28 and extends upwardly from the central plenum chamber 48 to define the exhaust port 39 of the cooling tower 10. The fan unit 37 is positioned within the stack 30 and is supported by horizontal support members 54 wherein the fan unit 37 employs a blade assembly coupled to a motor. Operation of the fan unit 37 causes currents of air to be drawn through the fill assemblies 26 and forces the currents upwardly through the plenum chamber 48 into the vertical stack 30 for discharge through the exhaust port 39.

Figure 7:
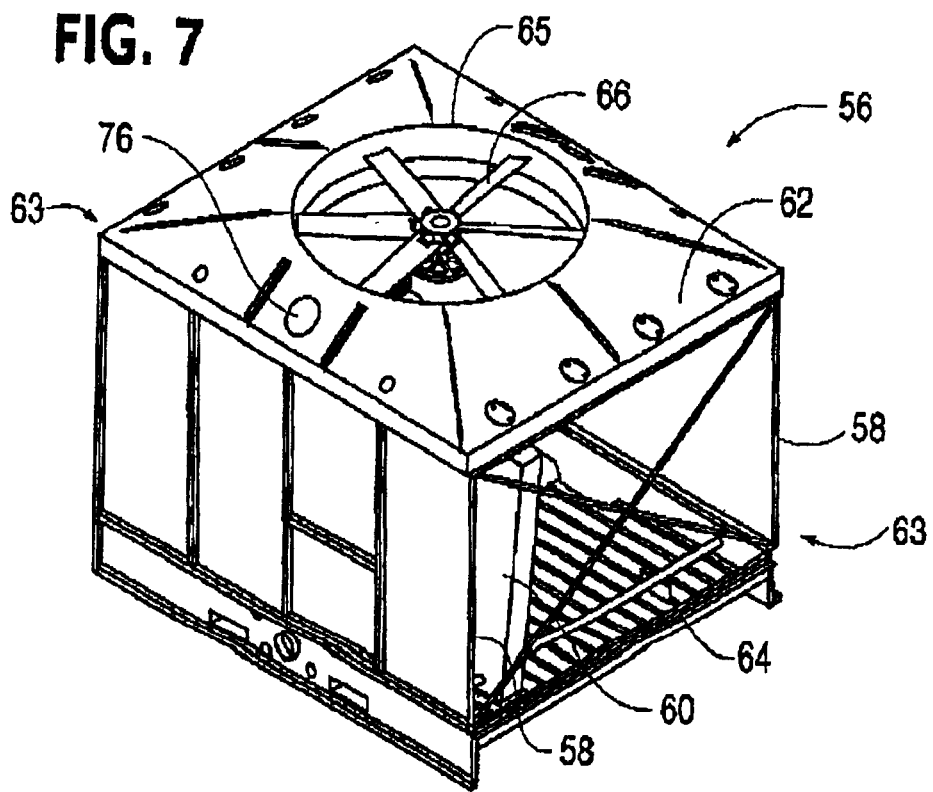
FIG. 7 is a perspective view of a second embodiment of a cross-flow cooling tower in accordance with the present invention.

A variety of alternative components and designs can be used in the water cooling towers of the present invention. FIG. 7 illustrates a second embodiment of the present invention wherein a cooling tower 56 is displayed having a steel frame assembly composed of mill galvanized steel, and having a top, a bottom, two opposed side walls, two opposed ends. More particularly, the tower consists of two opposed mill galvanized cold-formed steel side walls 58 parallel to one another, two upright fill assemblies 60, a self contained hot water distribution unit 62 above the fill assemblies 60, a cold water collection basin 64 below the fill assemblies 60, air intake ports 63, an exhaust port 65 and a cooling air current generator employing a fan unit 66.

Referring now to FIGS. 7–11, and in accordance with the present invention, the hot water distribution unit 62 is rotationally molded from polyethylene in one operation to produce a single, self enclosed unit that includes a generally planar, distribution pan or tray 68 having apertures, perforations and/or nozzles 69, four walls 70 unitarily connected to tower covers 72, and an opening 74 for tower exhaust. The covers 72 project outwardly and downwardly from the opening 74. More particularly, the distribution unit 62 is a self contained unit having a water inlet 76, a first set of opposing side walls 70 parallel to one another and second set of opposing sides walls 70 parallel to one another. Both sets of walls 70 extend vertically from the pan or tray 68 and intersect the tower covers 72 to form a unitary enclosure, employed for the distribution of hot water having a fan shroud 78. Raised portions 73 are designed to manage water delivered to distribution unit 62. Most importantly raised portions 73 serve to transform the inlet piping flow discharge disturbances into a more quiescent channel flow which is then released into distribution pans or trays 68. Another significant benefit of raised portions 73 is reduction in the amount of water inventory carried in distribution unit 62, which reduces the operating weight. The distribution unit 62 may be attached to the galvanized steel frame of the water cooling tower 56 by fastening means such as screw, welding, bolt, solder, and/or bracket.

Figure 11:
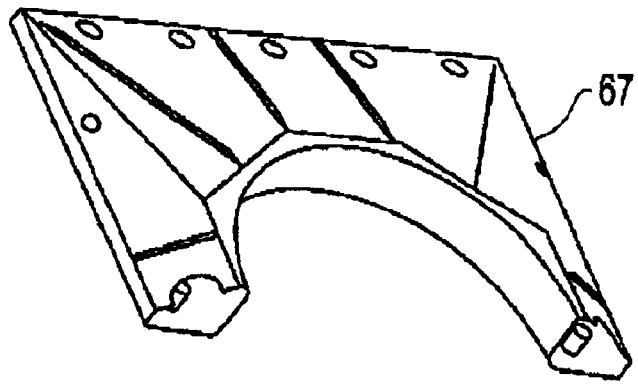
FIG. 11 is a perspective view of an alternative two-piece hot water distribution unit in accordance with the second embodiment present invention.

In addition, as illustrated in FIG. 11, should the tower be sufficiently large such that a single piece distribution unit 62 would be impractical to rotationally mold, the distribution unit 62 may be rotationally molded as two or more individual pieces 67 that are subsequently joined together to form a distribution unit 62.

Figure 12:
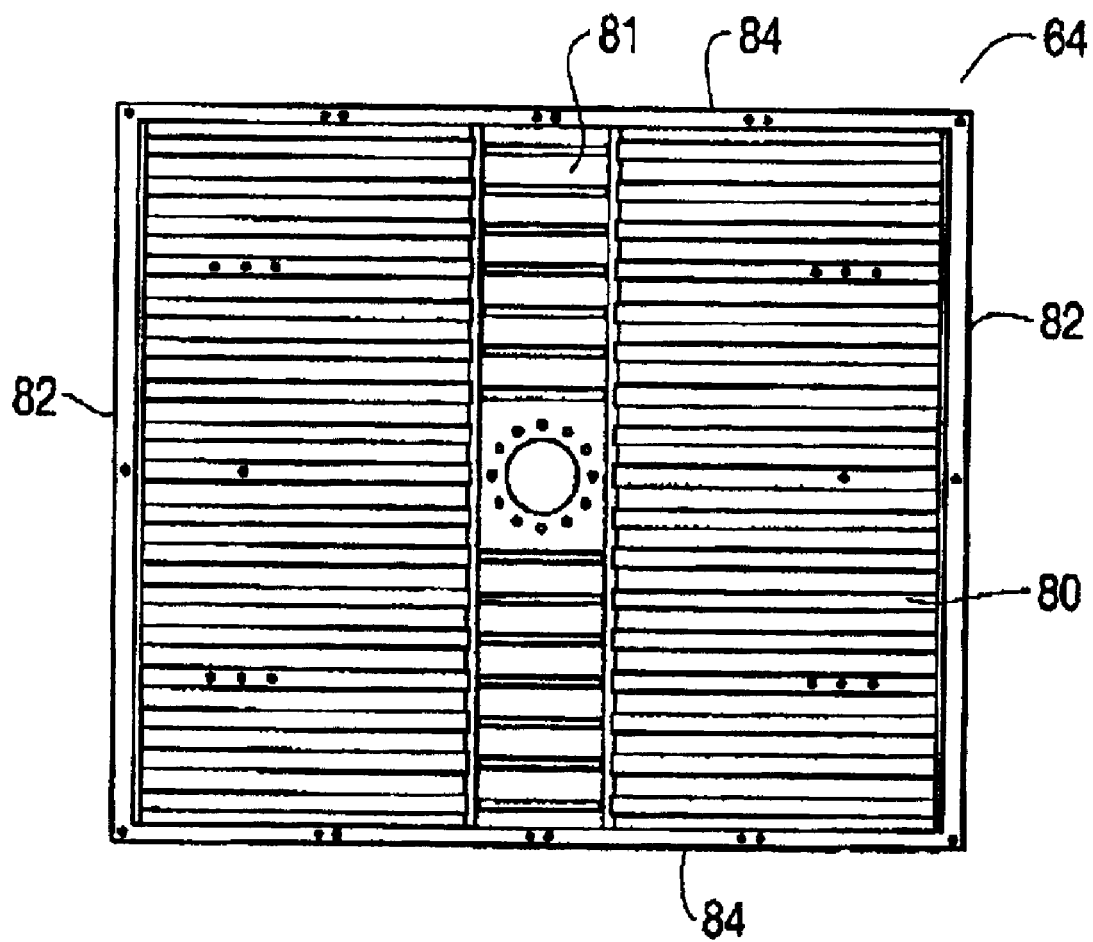
FIG. 12 is a top view of a cold water collection basin in accordance with the second embodiment of present invention.

Referring now to FIG. 12, the cold water collection basin 64 is disposed below the fill assemblies 60 in a position to receive liquid gravitating therefrom. The cold water basin 64 is a rotationally molded, unitary piece having a generally planar bottom surfaces 80 and 81, a first set of opposed side walls 82 extending parallel to one another away from the bottom surfaces 80, 81 and a second set of opposed side walls 84 extending parallel to one another away from the bottom surfaces 80, 81. The basin 64 extends across the entire width of the cooling tower and may be coupled to a pumping structure suitable for removing deposited liquid therein and for delivering the water to equipment requiring the same for cooling and/or returning the water to the supply source. The cold water basin 64 may be attached to the galvanized steel frame of the water cooling tower by fastening means such as screw, welding, bolt, solder, and/or bracket.

In addition, should the tower be sufficiently large such that a single piece collection basin 64 would be impractical to rotationally mold, the cold water collection basin 64 may rotationally molded as two or more pieces that are subsequently joined together to form a collection basin 64.

Figure 15:
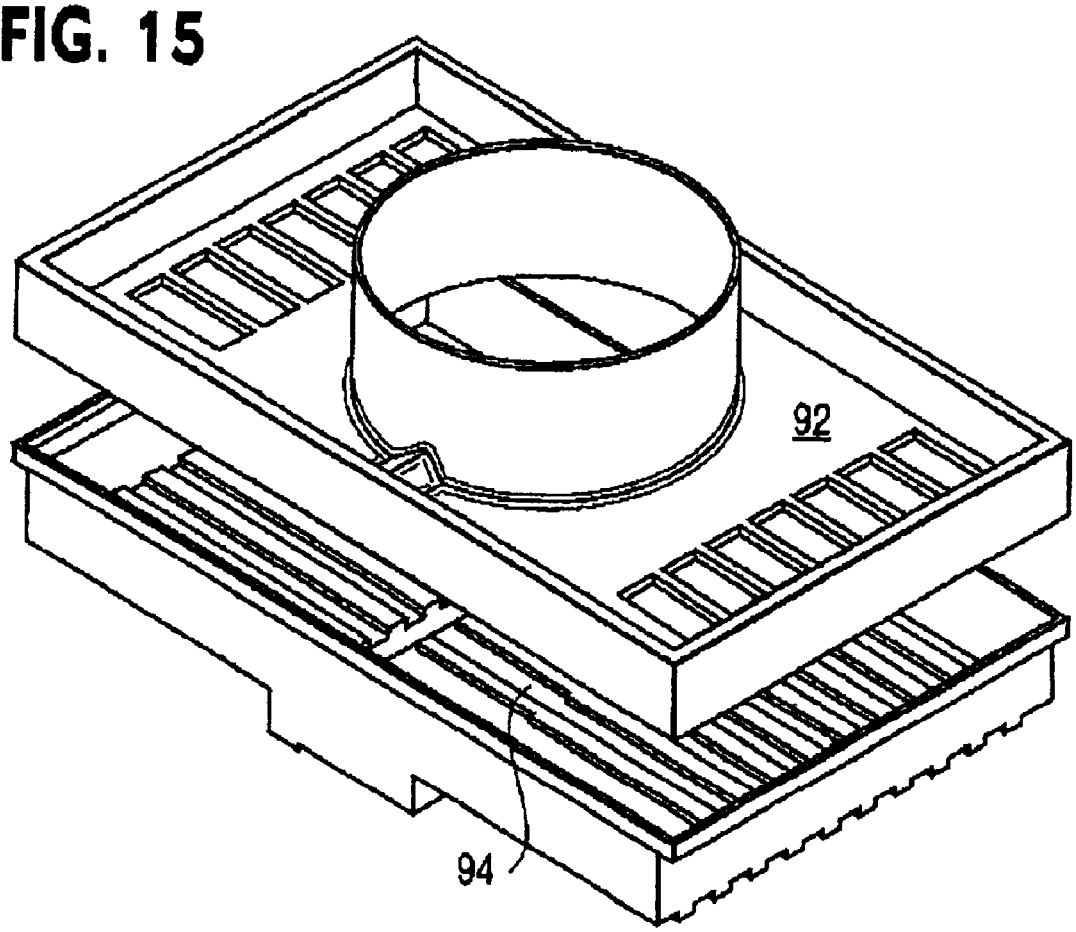
FIG. 15 is a perspective view of two liquid collection basins that are molded together as one entity and then separated in accordance with an alternative embodiment of the present invention.

In accordance with an alternative embodiment of the present invention, the hot water distribution unit 62 and collection basin 64 illustrated in FIGS. 7–11 may be rotationally molded together as one entity and then separated as illustrated in FIG. 15. As illustrated in FIG. 15, two basins 92 and 94 respectively, are rotationally molded simultaneously in a single molding process. The basins 92 and 94 are then separated by a cutting element. The basins are then incorporated into a water cooling tower assembly as previously described, wherein basin 92 is employed as a hot water distribution element and basin 94 is employed as a cold water collection basin.

The aforementioned molding process is advantageous because it allows for the creation of an enclosed mold which reduces the amount of waste produced during the molding process. If the basins were to be molded separately, a temporary top would be required to be molded for each piece so that the basin mold could be closed. The molded, temporary top portion would then have to be cut away from the basin to open it up resulting in wasted material. This embodiment does not include basin covers, however the covers may be fabricated separately and added to the tower assembly.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cross-flow cooling tower comprising:
   a frame assembly unitarily molded from a plastic material wherein said frame assembly comprises opposed top and bottom walls, opposed side walls extending between said top and bottom walls, opposed ends extending between said top and bottom walls, wherein said ends are open to define air intake ports;
   a vertical stack forming an exhaust port and extending vertically from said top wall; and
   a top cover, molded from a plastic material.

2. A cross-flow cooling tower comprising:
   a frame assembly unitarily molded from a plastic material wherein said frame assembly comprises opposed top and bottom walls, opposed side walls extending between said top and bottom walls, opposed ends extending between said top and bottom walls,
   wherein said side walls and said ends are unitarily connected to said top wall to form a hot liquid distributor having a plurality of spaced apart apertures and/or nozzles oriented to deliver hot liquid to be cooled;
   a vertical stack forming an exhaust port and extending vertically from said top wall; and
   a top cover, molded from a plastic material.

3. The cross-flow cooling tower according to claim 2, wherein said top cover projects outwardly and downwardly from said vertical stack.

4. The cross-flow cooling tower according to claim 2, wherein said top cover comprises two pieces.

5. The cross-flow cooling tower according to claim 2, wherein said top cover comprises a liquid inlet.

6. The cross-flow cooling tower according to claim 2, further comprising at least one cooling air current generator for directing air through said exhaust port.

7. The cross-flow cooling tower according to claim 2, wherein said top cover is attached to said hot liquid distributor by a fastener.

8. The cross-flow cooling tower according to claim 2, wherein said side walls and said opposed ends are connected to said bottom wall to form a liquid collection basin disposed below said hot liquid distributor.

9. The cross-flow cooling tower according to claim 2, further comprising a supplemental support structure that provides support to said frame assembly.

10. The cross-flow cooling tower according to claim 9, wherein said supplemental support structure comprises steel members.

11. The cross-flow cooling tower according to claim 2, further comprising an upright fill structure including a plurality of fill elements and presenting an upright air inlet face, an opposed upright air outlet face, and an upper face extending transversely between said inlet and outlet faces.

12. The cross-flow cooling tower according to claim 11, further comprising a cooling air current generator operable to produce cooling air currents which enter said fill structure via said inlet face and exit said fill structure both laterally via said outlet face and upwardly via said upper face.

13. The cross-flow cooling tower according to claim 11, further comprising a drift eliminator located adjacent to said upright air outlet face of said fill structure.

14. The cross-flow cooling tower top according to claim 2, further comprising a flow splitter that divides the flow of incoming liquid.

15. The cross-flow cooling tower according to claim 14, wherein said flow splitter is shaped like an inverted "V".

16. A frame assembly for a cooling tower comprising:
   a shell unitarily molded from plastic material, wherein said shell comprises opposed top and bottom walls, opposed side walls extending between said top and bottom walls, and opposed end walls extending between said top and bottom walls, wherein said end walls are open to define air intake ports.

17. A frame assembly for a cooling tower comprising:
   a shell unitarily molded from plastic material, wherein said shell comprises opposed top and bottom walls, opposed side walls extending between said top and bottom walls, and opposed end walls extending between said top and bottom walls,
   wherein said side walls and said end walls are unitarily connected to said top wall to form a hot liquid distributor, said distributor having a plurality of spaced apart apertures and/or nozzles oriented to deliver hot liquid to be cooled.

18. The frame assembly according to claim 17, where said top wall further comprises at least one opening formed therein for mounting an air current generator.

19. The frame assembly according to claim 17, wherein said side walls are aligned substantially perpendicular to said top and bottom walls.

20. The frame assembly according to claim 17, wherein said end walls are aligned substantially perpendicular to said top and bottom walls.

21. The frame assembly according to claim 17, wherein said top, bottom, side and end walls intersect to define an interior of said frame assembly.

22. The frame assembly according to claim 17, wherein said side walls and said end walls are unitarily connected to said bottom wall to form a liquid collection basin disposed below said hot liquid distributor.

23. The frame assembly according to claim 17, wherein at least a portion of said end walls are shaped as louvers.

24. A frame assembly for a cooling tower comprising:

a shell unitarily molded from plastic material, wherein said shell comprises opposed top and bottom walls, opposed side walls extending between said top and bottom walls, and opposed end walls extending between said top and bottom walls, wherein said end walls are removable and are shaped as cooling tower covers.

25. A cross-flow cooling tower comprising:

a frame assembly unitarily molded from a plastic material wherein said frame assembly comprises opposed top and bottom walls, opposed side walls extending between said top and bottom walls, opposed ends extending between said top and bottom walls;

a vertical stack forming an exhaust port and extending vertically from said top wall; and support members that provide support to said frame assembly, wherein said side walls and said ends are unitarily connected to said top wall to form a hot liquid distributor having a plurality of spaced apart apertures and/or nozzles oriented to deliver hot liquid to be cooled.

26. The cross-flow cooling-tower according to claim 25, further comprising louvers that are formed in said opposed ends of said frame assembly.

27. The cross-flow cooling tower according to claim 25, further comprising a top cover, molded from a plastic material.

28. A cross-flow cooling tower comprising:

a fame assembly unitarily molded from a plastic material wherein said frame assembly comprises opposed top and bottom walls, opposed side walls extending between said top and bottom walls, opposed ends extending between said top and bottom walls;

a vertical stack forming an exhaust port and extending vertically from said top wall; and means for providing supplemental support to said frame assembly, wherein said side walls and said ends are unitarily connected to said top wall to form a hot liquid distributor having a plurality of spaced apart apertures and/or nozzles oriented to deliver hot liquid to be cooled.

* * * * *